Jan. 5, 1954  E. BENOIT  2,664,700
JETPROPELLED AIRCRAFT TAIL UNIT
Filed Nov. 12, 1948  2 Sheets-Sheet 1

INVENTOR
EDMOND BENOIT,
BY
Robert B. ...
ATTORNEY

Jan. 5, 1954     E. BENOIT     2,664,700
JETPROPELLED AIRCRAFT TAIL UNIT

Filed Nov. 12, 1948     2 Sheets-Sheet 2

INVENTOR
EDMOND BENOIT,
BY
Robert B Larson
ATTORNEY

Patented Jan. 5, 1954

2,664,700

UNITED STATES PATENT OFFICE 2,664,700

JET PROPELLED AIRCRAFT TAIL UNIT

Edmond Benoit, Paris, France, assignor to Office National d'Etudes et de Recherches Aeronautiques (O. N. E. R. A.), Paris, France, a society of France Application November 12, 1948, Serial No. 59,551

Claims priority, application France March 20, 1948

2 Claims. (Cl. 60—35.54)

The present invention relates to jet propulsion plants, this expression including, in what follows, all power plants in which a propuulsion effect is obtained through direct reaction of gases escaping from the plant and it applies in particular to turbo-jet engines, impulse jet engines, athodyds, piston engine and airscrew units or turbine and airscrew units with jet exhaust, rockets, etc., said invention being more particularly but not exclusively concerned with aircraft power plants.

The object of this invention is to provide a plant of this kind which is better adapted to meet the requirements of practice than those used up to this time.

Said invention consists chiefly in arranging the jet nozzle of the power plant so that the propulsive jet issues therefrom in the form of at least two flat gaseous sheets making together at least one dihedron, preferably a right-angled one, means being advantageously further provided for varying, inside certain limits, the mean direction of at least one of said sheets in order to produce a control torque with respect to the center of gravity of the body to be propelled.

Preferred embodiments of my invention will be hereinafter described with reference to the accompanying drawings, given merely by way of example and in which:

Fig. 4 shows, in perspective view and with parts cut away, the nozzle of a jet propulsion plant made according to a second embodiment of the invention;

The invention will be described, by way of example, as applied to a jet propulsion plant for an aircraft, this plant including at least one jet nozzle 1.

Concerning first this plant considered as a whole with the exception of jet nozzle 1, it can be made in any suitable usual manner, whether, for instance, atmospheric air is used as comburent or, alternately, there is provided inside said plant a reserve of fuel and comburent as in the case of rockets, the gaseous mixture that is obtained being, in all cases, expelled through said nozzle 1.

Concerning now this nozzle, it is arranged, according to the main feature of the present invention, in such manner that the propulsive jet issues therefrom in the form of at least two flat gaseous sheets making together at least one dihedron.

In this way, the gaseous flow issuing from the propulsion jet, instead of occupying a space of revolution of conical shape, as this is the case with the usual nozzles, will be in the form of at least two sheets making an angle with each other, preferably a right angle, and constituting, in line with the nozzle, a kind of stabilizing tail unit capable of completing the action of fins or other parts of the same nature (eventually of replacing these parts), the stabilizing effect thus obtained concerning both pitch and yaw effects.

Furthermore, the surrounding air will be driven along an increased contact area and the propulsive efficiency of the jet will be accordingly improved by increase of the momentum.

Preferably, the section of nozzle 1 is made to pass gradually from a circular shape, in its restricted region 1a, to a flat shape with several branches, in its end region.

Figure 1:
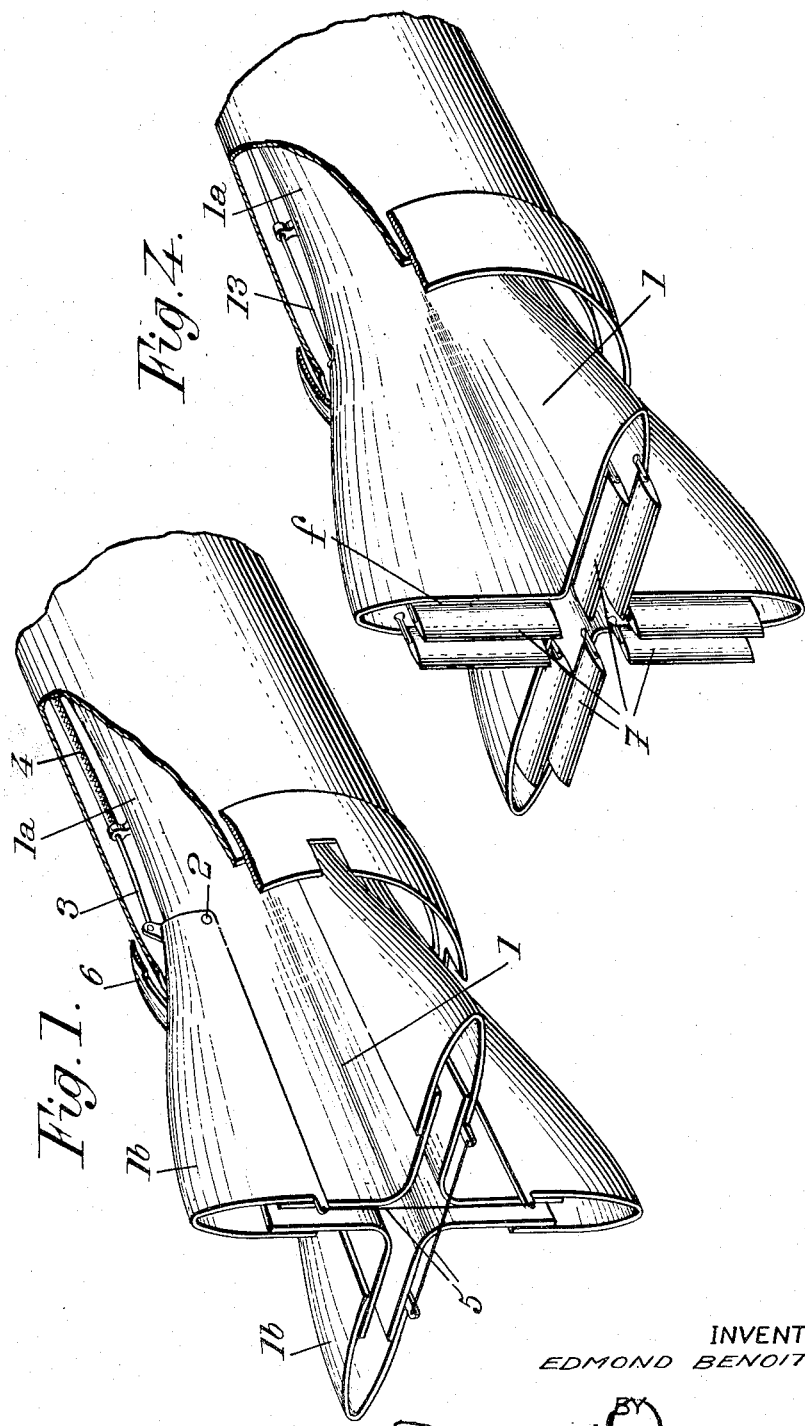
Fig. 1 shows, in perspective view and with parts cut away, the nozzle of a jet propulsion plant made according to a first embodiment of the invention.
Figure 2:
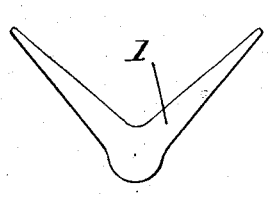
Figs. 2 and 3 are diagrammatical views showing modifications in the section of said nozzle.
Figure 3:
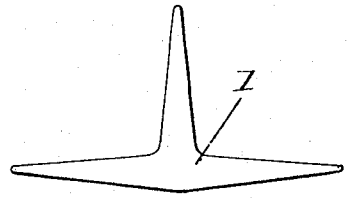

For instance, the portion of nozzle 1 which is to produce a dihedron-shaped jet, may have:

Either a cruciform section, as shown by Fig. 1, in which case the branches of said nozzle are advantageously arranged respectively in a horizontal plane and in a vertical plane, Or a V-shaped section, as diagrammatically illustrated by Fig. 2, Or again a T-shaped section, preferably inverted, with a vertical central branch, as shown by Fig. 3.

It is of interest further to provide means through which the mean direction of at least one of the gaseous sheets which constitute the propulsive jet can be modified, within certain limits, so as to produce a control torque with respect to the center of gravity of the aircraft.

Of course such means, which in fact constitute controls, can be operated at will by the eventual pilot or by any suitable automatic piloting or guiding system.

I will more particularly consider hereinafter, by way of example, the adaptation of said control means to a nozzle of the cruciform type such as shown by Fig. 1, but it remains well understood that the whole or part of the constructional arrangements which are now going to be described could be applied to other types of nozzles with flat branches and in particular to nozzles of V-shaped or inverted T-shaped section such as shown by Figs. 2 and 3.

According to a first solution illustrated by Fig.

1, the means for deflecting the gaseous sheets issuing from the branches of nozzle 1 may be obtained by providing said branches with an end portion movable, advantageously in a telescopic manner, with respect to a fixed central portion.

For instance each of the branches of said central portion of cruciform section is fitted with a kind of hood 1b adapted to be more or less engaged on the corresponding fixed branch 1a, said hood being pivoted at its front part to the nozzle body about an axis 2.

This hood is given an external shape suitable for the flow of air at the speed of utilization of the aircraft, which speed may be a supersonic one.

Operating means are provided for producing conjugated displacements in the same direction of the hoods provided on two opposite branch elements.

Such an operating system may be constituted by a hydraulic, electric or mechanical telecontrol device of a conventional type, but it seems particularly simple and advantageous to have recourse, for this purpose, to the embodiment illustrated by Fig. 1 and according to which each hood 1b is controlled by a cable 3 placed in a sheath 4 and said hood is connected with the diametrally opposite hood through a fine wire extending across the jet, the whole of the operating cables of the various hoods being advantageously enclosed inside an annular casing 6.

It will then suffice to pivot in the same direction two diametrally opposite hoods for obtaining an angular deflection of the corresponding sheet and, therefore, a control torque tending to modify the position of the aircraft.

But the control means may also be constituted by pivotable controls 7 on at least some of the edges of the outlet orifice of nozzle 1, the efficiency of said controls being increased by the fact that they are swept over by the propulsive jet over a length substantially greater than in the case of controls submerged in a jet of circular section.

It should be noted that this solution might be applied only to the horizontal branches or to the vertical branches of the nozzle, the other branches being either left fixed or, on the contrary, provided with control means according to the first solution.

It has been supposed, in Fig. 4, by way of example, that the whole of the branches of a cruciform nozzle 1 is fitted with pivotable controls 7 and that each of said branches included two of these controls disposed immediately in line with the trailing edges of the nozzle.

Figure 5:
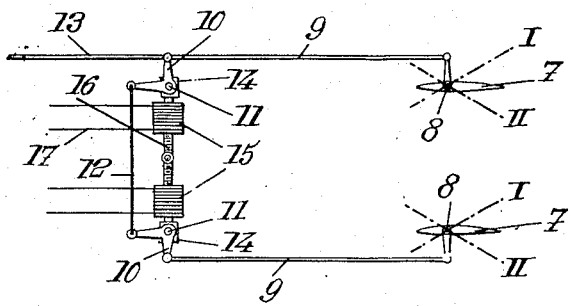
Fig. 5 shows a portion of the control operating means with which the nozzle shown by Fig. 4 is provided.

Such an embodiment is illustrated by Fig. 5.

Each control 7 is pivoted about an axis 8 substantially parallel to the trailing edges of the branch of nozzle 1 that is considered, and said control is connected, through a control rod 9, with a bell crank lever 10 mounted on a pivot axis 11.

The movements of the two controls corresponding to the same branch of the nozzle are interrelated by connecting the respective free ends of their bell crank levers through a rod 12.

And one of said bell crank levers is controlled by a rod 13 operation of which then permits of pivoting both controls kept in parallel relation to each other between two limit positions diagrammatically illustrated by the dotted lines I and II of Fig. 5.

It will be seen that said controls will act, concerning that pivoted outwardly, through its external face on the flow of atmospheric air so as to give rise to a control torque and, concerning that pivoted toward the inside, through its internal face, on the propulsive jet, producing a deflection thereof which comes to reinforce the action of said control torque.

The efficiency of said controls will be the more intensive as the aircraft is moving at higher speeds (close to the velocity of sound or above it) in a rarefied atmosphere, all these conditions being little favorable to a good operation of conventional controls.

On the other hand, it will be of interest aerodynamically to balance controls 7 by suitably positioning their axes 8 and to produce, between the trailing edges of nozzle 1 and the leading edge of said controls, a slot f (Fig. 4) the opening of which will produce a suction or a blowing off of the boundary layer according as the control that is considered is turned toward the inside or toward the outside.

Figure 6:
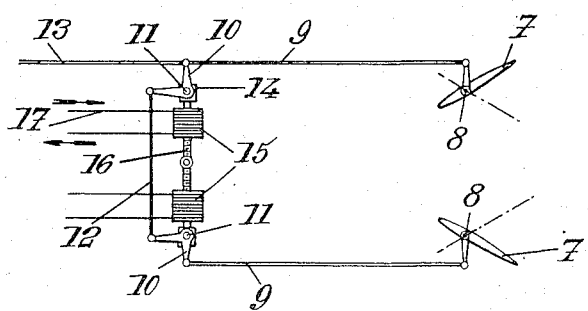
Fig. 6 shows said control means in another position of operation.

Finally, according to a particular feature of the invention, the controls 7 that concern a common branch of nozzle 1 may be mounted so that they can be given, in addition to the parallel pivoting movements above mentioned, pivoting displacements in opposite directions bringing them into divergent position (as shown in solid lines by Fig. 6) or into convergent position (as diagrammatically illustrated by the dotted lines of Fig. 6).

Such an arrangement is shown by Fig. 5.

The axes 11 of bell crank levers 10 are mounted in such manner that they can be moved transversely along slideways 14, said axes being controlled by drums 15 adapted to be screwed and unscrewed along a fixed rod 16 with right and left screw threads.

For producing conjugated rotations of drums 15, I make use of cables 17 operable simultaneously and wound in such manner that their operation in one direction causes said drums to be moved toward each other and therefore controls 7 to converge toward each other, whereas their operation in the opposed direction increases the distance between drums 15 and the divergence between said controls.

Thus, in addition to their utilization as controls proper, elements 7 can be used to act both as an aerodynamic brake, when brought into the divergent position, and as drag reducers, when they are brought into the convergent position, in case of interruption or of substantial drop of the output of the propulsive jet.

It should be noted that I might still, when the outlet orifice of the nozzle is disposed symmetrically with respect to the axis of the machine, make use, according to a particular feature of the invention, of the jet deflecting means above described for correcting rolling.

It suffices, for this purpose, to be able to operate the right hand side horizontal controls independently of the left hand side horizontal controls, or the upper controls independently of the lower controls so as to create an anti-rolling moment. Thus, for instance, if the upper controls are pivoted toward the left (as for turning toward the left) and the lower controls are pivoted in the opposite direction so as to destroy the yawing moment, there will remain a rolling torque opposed to that which it is desired to destroy. Besides, this action can be accentuated if the horizontal controls are also used for the same purpose and it is then possible to dispense with ailerons.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a jet propulsion plant, in combination, a jet nozzle having its rear part shaped to constitute at least two flat branches located in planes parallel to the axis of said nozzle and making together a dihedral angle, said branches including a fixed central portion and a movable marginal section slidable on said fixed portion, and means for controlling the position of said marginal portion with respect to said fixed portion.

2. In a jet propulsion plant, in combination, a jet nozzle having its rear part of cruciform section to constitute four flat branches located in two planes passing through the axis of said nozzle and at right angles to each other, at least two opposite branches including each a fixed central portion and a movable marginal section slidable on said fixed portion, and means for simultaneously controlling the position of said two marginal portions with respect to said fixed portions.

EDMOND BENOIT.

References Cited in the file of this patent

UNITED STATES PATENTS

| Number | Name | Date |
| --- | --- | --- |
| 107,603 | DuFaur | Sept. 20, 1870 |
| 924,665 | Jackson | June 15, 1909 |
| 1,441,982 | Heylman et al. | Jan. 9, 1923 |
| 2,280,835 | Lysholm | Apr. 28, 1942 |
| 2,382,386 | Arms | Aug. 14, 1945 |

FOREIGN PATENTS

| Number | Country | Date |
| --- | --- | --- |
| 427,017 | Great Britain | Jan. 9, 1934 |